(12) United States Patent
Zheng

(10) Patent No.: US 7,790,240 B2
(45) Date of Patent: Sep. 7, 2010

(54) PERMEABLE GLASS MAT AND METHOD OF PREPARATION

(75) Inventor: Guodong Zheng, Englewood, CO (US)

(73) Assignee: Johns Manville, Denver, CO (US)

( * ) Notice: Subject to any disclaimer, the term of this patent is extended or adjusted under 35 U.S.C. 154(b) by 110 days.

(21) Appl. No.: 11/900,848

(22) Filed: Sep. 13, 2007

(65) Prior Publication Data

US 2009/0075541 A1    Mar. 19, 2009

(51) Int. Cl.
    *B05D 1/18*    (2006.01)
(52) U.S. Cl. .............. 427/434.2; 427/430.1; 427/439; 427/402
(58) Field of Classification Search .............. 427/430.1, 427/434.2
    See application file for complete search history.

(56) References Cited

U.S. PATENT DOCUMENTS

| | | | | |
|---|---|---|---|---|
| 4,018,862 A | * | 4/1977 | Saito | 264/137 |
| 5,772,846 A | * | 6/1998 | Jaffee | 162/145 |
| 7,138,346 B2 | * | 11/2006 | Bush et al. | 442/180 |
| 2007/0093159 A1 | * | 4/2007 | Kajander | 442/118 |
| 2007/0286982 A1 | * | 12/2007 | Higgins et al. | 428/95 |

* cited by examiner

*Primary Examiner*—David Turocy
(74) *Attorney, Agent, or Firm*—Robert D. Touslee

(57) ABSTRACT

Provided is a coated nonwoven mat prepared by the process of passing a nonwoven mat over the surface of a binder or coating slurry to touch the bottom side of the mat sufficiently to fully wet the glass mat. The wetted nonwoven mat is then immersed in a slurry of the binder or coating material to fully saturate the mat with the slurry material. The process of the present invention allows one to control the porosity of the saturated fibrous nonwoven mat at high consistency with reduced scrap rate. The saturated mat will have improved tensile strength.

8 Claims, 1 Drawing Sheet

PERMEABLE GLASS MAT AND METHOD OF PREPARATION

BACKGROUND OF THE INVENTION

1. Field of the Invention

The present invention relates to a permeable glass mat and a method of preparation therefor. More specifically, the porosity of the glass mat from fully sealed to highly open can be controlled by employing the method of the present invention.

2. Description of the Related Art

Fibrous non-woven mats are often formed into a wet mat from an aqueous dispersion of fibers such as glass and/or synthetic organic fibers. The dispersion can include other fibers such as cellulose fibers, ceramic fibers, etc. and can also include particles of inorganic material and/or plastics. Usually a solution of urea formaldehyde resin, usually modified with a thermoplastic polymer, or one of many other known resin binders is applied to the wet non-woven web of fibers and then, after removing excess binder and water, the binded web is dried and heated further to cure the urea formaldehyde resin or other resin binder to form a non-woven mat product. Typical processes are disclosed in U.S. Pat. No. 7,138,346, the disclosure of which is hereby incorporated herein by reference.

In prior coating methods, often a raw glass mat enters a coating station at a level lower than the top of an application roll. The direction of travel of the glass mat is parallel to a machine direction. The application roll is driven to rotate about its axis and dip into a coating pan. The coating pan is filled with a coating mix up to a level that is sufficient for the application roll to pull an adequate amount of coating to the top of the application roll. The speed of rotation of the application roll is adjusted to get adequate amounts of coating mix up into the glass mat as the glass mat is conveyed. The glass mat can extend around the application roll to the degree desired. A scraper blade is used to scrape off excess coating, which falls preferably back into the coating pan. The coated mat then proceeds into a dryer section.

The history of gypsum board development has passed many milestones, many of these milestones being related to the surfaces, or facers, covering the broad surface of a gypsum board. In almost all cases, the subject of a facer stability was an issue. Also the facers have had to resist weathering as well as retaining constant dimensions. Mildew and mold have been a problem with the original multi-ply paper facers used on gypsum board. Unfortunately, the paper facers also might not allow water vapor to escape. Yet the escape of water vapor is essential in curing the gypsum. While these paper facers have been modified with chemicals to improve their properties, most of the gypsum board progress and success has come by changing from paper facers to fiberglass mat facers.

The entire scope of manufacturing different facer materials for building products is extensive, encompassing both fields of gypsum board fiberglass facers and thermosetting polyiso foam insulation board facers. In recent years, many facer-related methods and products thereof have been taught in various publications, including numerous United States patents.

Coating processes often fail to permit close control of the porosity of a glass mat. This can be important, particularly with a heavy solid coating mix, and for gypsum facers. As mentioned above, the escape of water vapor is essential in curing/drying gypsum. The key is to control the porosity of the coated facer mat so that the coating is protective, yet porous enough to allow the water vapor to escape during heating.

It is an objective of the present invention to provide such a process for coating glass mats, with coatings having a wide range of solid content, in order to control the porosity of the mat.

SUMMARY OF THE INVENTION

Accordingly, provided by the present invention is a permeable, coated, fibrous non-woven mat made by the process of first passing the non-woven mat over the surface of a binder or costing slurry to touch the bottom side of the mat sufficiently to fully wet the glass mat. After the welting step, the mat is then immersed in the slurry to fully saturate the mat with the slurry material. Also provided is the process for preparing the coated non-woven mat involving the step of first passing the non-woven mat over the surface of a binder of coating slurry to touch the bottom side of the mat sufficiently to fully wet the glass mat, followed by the step of then immersing the mat in the slurry to fully saturate the mat with the slurry material.

Among other factors, it has been found that the present process of first touching the bottom side of the mat to fully wet the glass mat followed by immersion in the slurry permits one to prepare a non-woven mat, preferably a glass mat, with a controlled porosity. The porosity can be controlled by controlling the solid content of the slurry, introducing foam into a slurry, and/or controlling blade pressure to remove excessive slurry at a desired level.

In a preferred embodiment, a second impregnation or saturation of the mat can take place should additional coating be desired.

DETAILED DESCRIPTION OF THE INVENTION

For making a glass mat facer in different applications, the coating is always applied on the glass mat to fully or partially seal off the surface. In the present invention, the method comprises impregnating a glass mat in a slurry containing solids. The viscosity is controlled in making the saturated glass mat.

Figure 1:
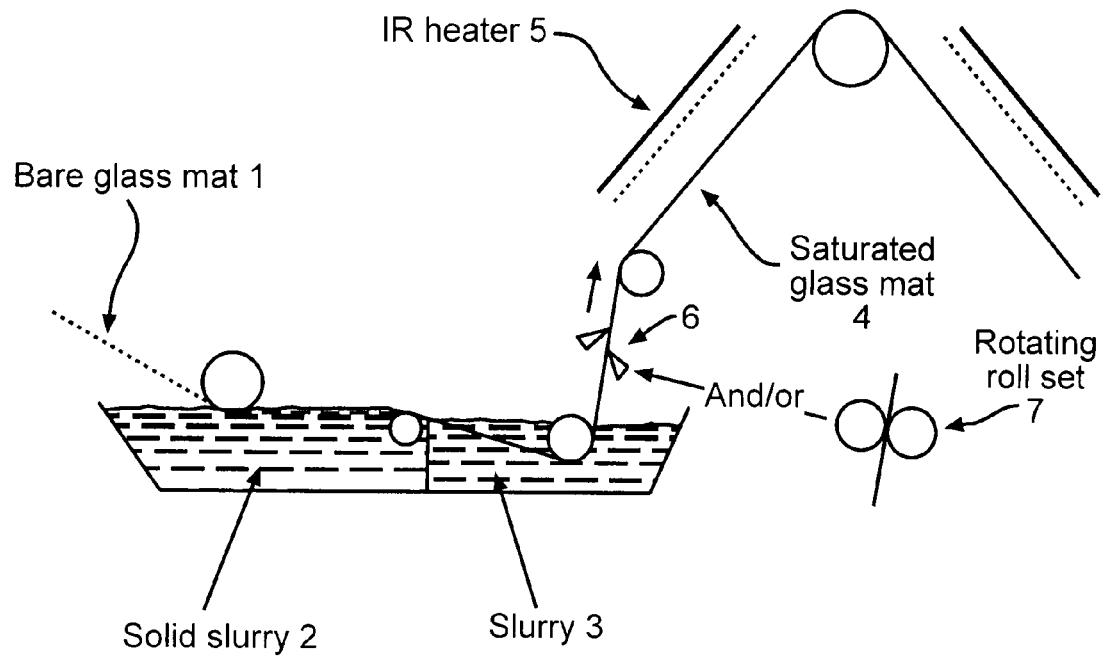
FIG. 1 depicts a coating process of the present invention yielding a first impregnation.
Figure 2:
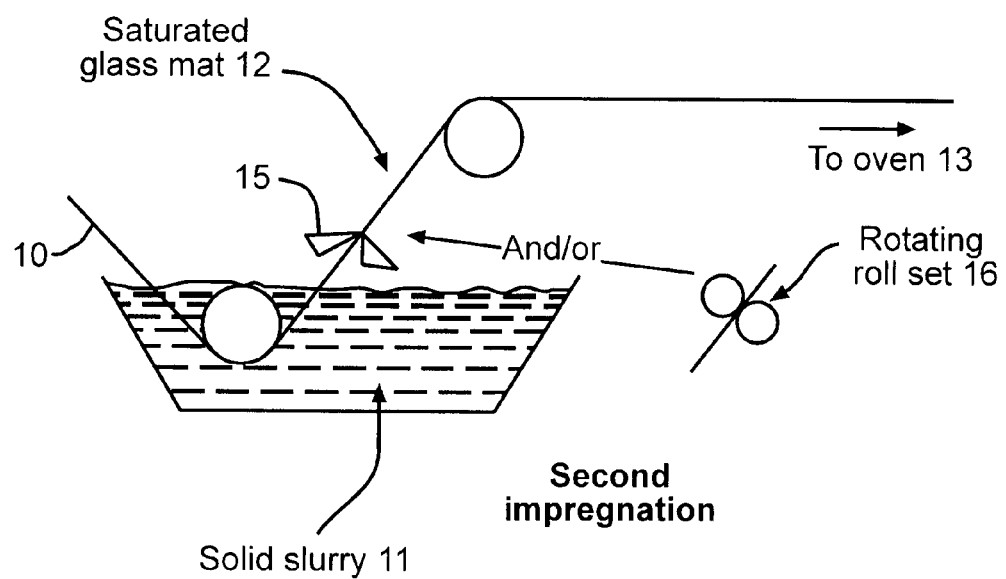
FIG. 2 depicts an optimal second impregnation.

Referring to the figures of the drawing, in FIG. 1, the glass mat 1 passes over the surface of a solid slurry 2 to pre-wet the glass mat by touching the glass mat on the bottom side. When the slurry impregnates the glass mat 1 from the bottom side of the glass mat, air in the glass mat will be pushed up and the slurry will fully wet the glass mat. Then pre-wet glass mat goes into the slurry 3 to get further saturated. The saturated glass mat 4 can the be dried by passing the mat by IR heaters 5. Other heating devices such as microwave electromagnetic radiation can also be used. If a higher weight of coating or lower porosity is required, a second impregnation can be made as shown in FIG. 2. Blades 6 and/or a rotating roll set 7 can be used to remove excessive slurry, or to simply control the slurry to a desired level.

In FIG. 1, slurry 2 can be different from slurry 3 in terms of solid content and ingredients. The solid content of slurry can be much lower than slurry 3 or just water containing a wetting agent for wetting purposes or other conventional additives.

The ingredients of slurry 2 may be formulated differently from slurry 3, which results in two layers. For low cost with the same performance, one can use a less expensive formulation in slurry 2 and better formulation in slurry 3. For special performance, each slurry may introduce an individual feature for better combination results such as color effect, smoothness, flexibility, anti-flame, anti-mold, anti-static, waterproof, printability and paintability, etc.

In a conventional coating process, the moisture content of a mat would dramatically affect coating quality due to inconsistent changes in coating viscosity as a result of moisture intake by the mat. Particularly, a high viscose coating formulation such as a high solid coating may encounter unemployable difficulty due to moisture change at the interface of the mat and coating. With the present pre-wet process, the mat will have an equilibrium moisture content before immersion into slurry 3. It will lead to great consistency in the process and a precisely controlled saturated weight and porosity.

A coating is generally pushed from one surface into a mat in a conventional coating process. The coating penetrated through the mat is loosely packed in the mat. The tensile improvement of a coated mat compared to a bare mat is in a limited range. With the pre-wet and saturation process described herein, solid with binder is able to cover tightly on the glass fiber surface. A higher bonding strength of solid composite on the glass surface will provide for more improved tensile strength of the saturated mat compared to a coated mat.

With the present invention, the resistance on the mat used by a passing blade or a rotating roll set can be lower, which will allow a faster production line speed for higher productivity.

In FIG. 2 the impregnated glass mat 10 is immersed into a container of slurry 11 to prepare a further saturated mat 12. The saturated glass mat 12 then goes 13 into an oven for further drying. Blades 15 and/or a rotating roll set 16 can be used to remove excessive slurry.

The porosity of the saturated glass mat can be controlled from fully sealed to highly opened (up to 200 CFM). The porosity is controlled in the following ways:
a. Control solid content of slurry while remaining viscosity at workable range.
b. Introducing foam by adding foaming former and/or foam stabilizer and mixing or through a foam-generator.
c. Adding defoamer to the formulation to achieve maximum slurry density for a tight seal with minimum saturated weight.
d. Control blade and/or rotating roll pressure to remove excessive slurry at a desired level.

The present process allows one to achieve a fully saturated glass mat with controlled porosity so that it can be successfully used as a facer for gypsum board. The coated glass mat can also be used as a facer in other building materials. The porosity is controlled at high consistency with reduced scrap rate. The saturated mat has improved tensile strength. The process also finds unique applicability in a high solid coating for a glass mat, such as with an alkali metal silicate. Such a coated glass mat is described in co-owned patent application U.S. application Ser. No.. 11/900,849 which is hereby incorporated by reference.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A process for preparing a coated, fibrous, nonwoven mat having a controlled porosity, the process comprising:
   passing a nonwoven mat over the surface of a binder or coating slurry to touch the bottom side of the mat sufficiently to fully wet the mat, and then
   immersing the mat in a slurry to fully saturate the mat with the slurry material, wherein the solids content of the binder or coating slurry used to touch the bottom side of the mat is less than the solids content of the slurry into which the mat is immersed, and with the solids content of the two slurries being pre-determined in order to control the porosity of the mat.

2. The process of claim 1, wherein the mat is immersed in the slurry at least twice to fully saturate the mat with the slurry material.

3. The process of claim 1, wherein the binder or coating slurry is different from the slurry into which the mat is immersed.

4. The process of claim 3, wherein the binder or coating slurry is only water with a wetting agent or other additives.

5. The process of claim 1, wherein after immersion the mat is dried by infrared heaters.

6. The process of claim 5, wherein subsequent to drying by the infrared heaters, drying of the mat is completed in an oven.

7. The process of claim 1, wherein a blade or rotating roll set is used to remove excessive slurry after immersion to a desired level.

8. The process of claim 1, wherein the slurry contains a foam.

* * * * *